US011908256B2

(12) United States Patent
Syed

(10) Patent No.: US 11,908,256 B2
(45) Date of Patent: Feb. 20, 2024

(54) ELECTRONIC LOCK BOX

(71) Applicant: Sajjad Mustafa Syed, Lahore (PK)

(72) Inventor: Sajjad Mustafa Syed, Lahore (PK)

( * ) Notice: Subject to any disclaimer, the term of this patent is extended or adjusted under 35 U.S.C. 154(b) by 227 days.

(21) Appl. No.: 17/385,910

(22) Filed: Jul. 27, 2021

(65) Prior Publication Data

US 2023/0036924 A1 Feb. 2, 2023

(51) Int. Cl.
*G07C 9/00* (2020.01)
*A47G 29/14* (2006.01)

(52) U.S. Cl.
CPC ....... *G07C 9/00182* (2013.01); *A47G 29/141* (2013.01); *G07C 9/00896* (2013.01); *G07C 9/00944* (2013.01); *A47G 2029/145* (2013.01); *A47G 2029/147* (2013.01); *A47G 2029/149* (2013.01); *G07C 2009/0092* (2013.01); *G07C 2009/00246* (2013.01)

(58) Field of Classification Search
CPC ............ G07C 9/00182; G07C 9/00896; G07C 9/00944; G07C 2009/00246; G07C 2009/0092; A47G 29/141; A47G 2029/145; A47G 2029/149
See application file for complete search history.

(56) References Cited

U.S. PATENT DOCUMENTS

2020/0250915 A1* 8/2020 Schachte .............. A47G 29/141

* cited by examiner

*Primary Examiner* — Daniell L Negron

(57) ABSTRACT

In some aspects, an electronic lock box may include a heated section, a cooled section, a non-temperature controlled section, and a processor. The processor may receive, from a server, an indication of an electronic order. The processor may identify a code associated with an item. The processor may determine, from the code, a tracking number associated with the item and the description of the item. The processor may determine that the tracking number associated with the item corresponds to a tracking number associated with the electronic order and that a current date corresponds to an expected delivery date. The processor may provide an instruction to unlock the heated section, the cooled section, or the non-temperature controlled section to hold the item based on the description of the item. The processor may maintain an environmental status of sensors (e.g., weight, volume, temperature, operations, and/or location) within the electronic lock box.

20 Claims, 6 Drawing Sheets

ELECTRONIC LOCK BOX

BACKGROUND

An item may be delivered to a home or business. The item may have been purchased via an electronic marketplace. A delivery person may leave the item outside of the home or business making the item vulnerable to theft and exposure to the environment. The item may include address information that identifies the home or business, which may enable the delivery person to identify an appropriate home or business for delivery of the item. The item may also include an order number, item characteristics generated by a marketplace at a time of ordering.

SUMMARY

In some aspects, an electronic lock box, includes: a heated section that includes a first locking mechanism; a cooled section that includes a second locking mechanism, three motors to open/close the relevant section; a non-temperature controlled section that includes a third locking mechanism; a code reader; a processor, coupled to a memory, configured to: receive, from a server, an indication of an electronic order, wherein the indication includes a description of an item, a tracking number associated with the electronic order, and an expected delivery date associated with the electronic order; store, in the memory, the indication of the description of the item, the tracking number, and the expected delivery date; identify, via the code reader, a code associated with an item; determine, from the code, a tracking number associated with the item and the description of the item; determine that the tracking number associated with the item corresponds to the tracking number associated with the electronic order; determine that a current date corresponds to the expected delivery date associated with the electronic order; and provide, to the first locking mechanism, the second locking mechanism or the third locking mechanism, an instruction to unlock the heated section, the cooled section, or the non-temperature controlled section, respectively, to hold the item, wherein the instruction is provided to unlock and open the heated section, the cooled section or the non-temperature controlled section based on the description of the item.

In some aspects, an apparatus includes: a first section that includes a first locking mechanism; a second section that includes a second locking mechanism; a third section that includes a third locking mechanism; a code reader; a processor, coupled to a memory, configured to: receive, from a server, an indication of an electronic order, wherein the indication includes a description of an item, a tracking number associated with the electronic order, and an expected delivery date associated with the electronic order; store, in the memory, the indication of the description of the item, the tracking number, and the expected delivery date; identify, via the code reader, a code associated with an item; determine, from the code, a tracking number associated with the item and the description of the item; determine that the tracking number associated with the item corresponds to the tracking number associated with the electronic order; determine that a current date corresponds to the expected delivery date associated with the electronic order; and provide, to the first locking mechanism, the second locking mechanism or the third locking mechanism, an instruction to unlock the first section, the second section, or the third section, respectively, to hold the item, wherein the instruction is provided to unlock the first section, the second section or the third section based on the description of the item.

DETAILED DESCRIPTION

Figure 1:
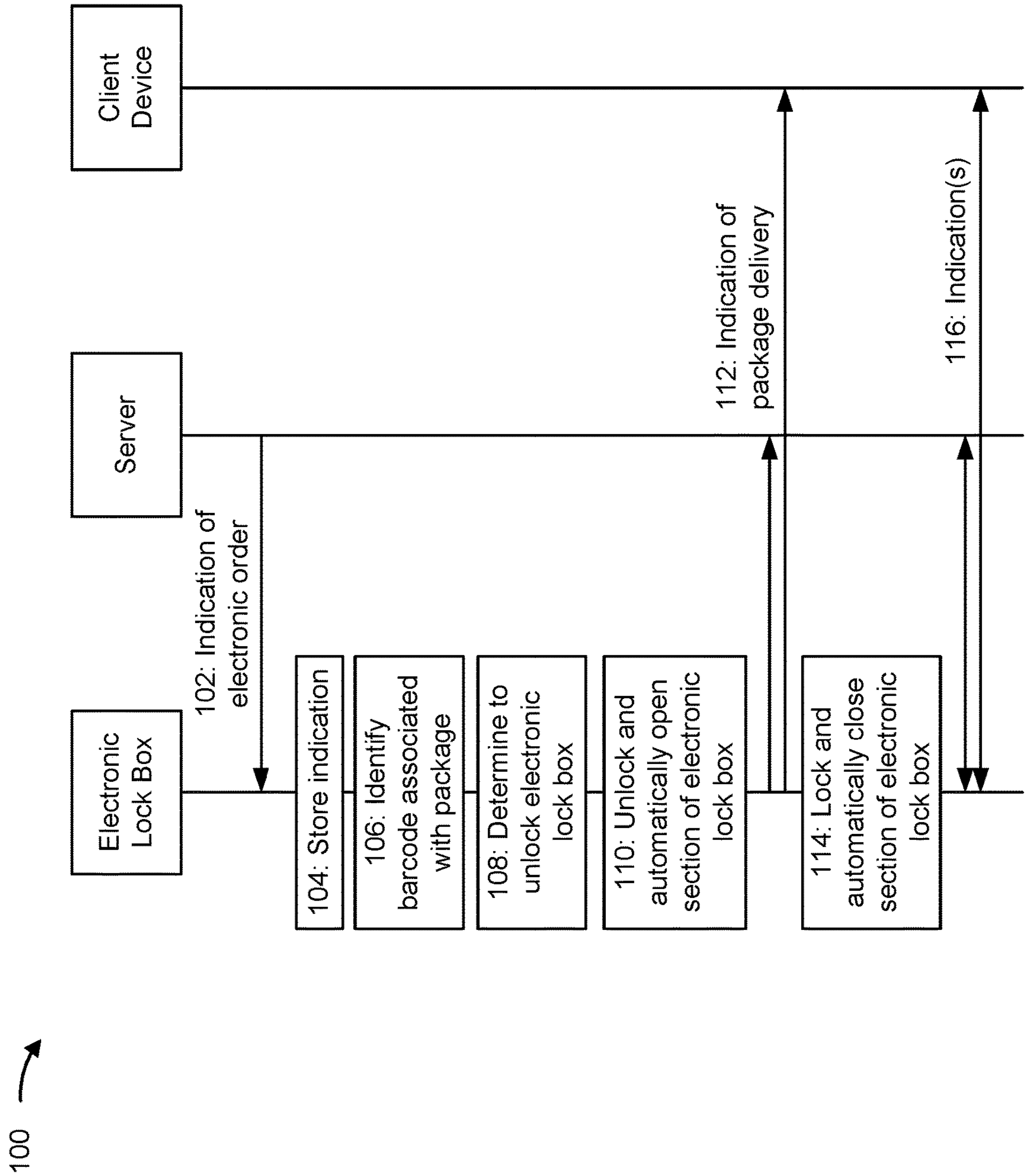
FIG. 1 is a diagram of an example implementation relating to operating electronic lock boxes.

The following detailed description of example implementations refers to the accompanying drawings. The same reference numbers in different drawings may identify the same or similar elements.

An item may often be left outside a home or business when a person is not available to receive the item during delivery. The item that is left outside the home or business may be at risk for being stolen, or the item may be tampered with when left outside the home or office. Further, the item may be exposed to weather elements, such as rain, snow, wind, high or low temperatures, humidity, etc., which may increase a risk of damage to the item.

In various aspects of techniques and apparatuses described herein, an electronic lock box may be placed outside the home or business to hold the item after delivery. The electronic lock box may include various sections or compartments, which may be suitable for use depending on a type of item delivered to the home or business. The electronic lock box may include a heated section to hold items that should stay warm. The electronic lock box may include a cooled section to hold items that should stay cooled. The electronic lock box may include a non-temperature controlled section (e.g., a section without temperature control), which may be suitable to hold items that do not need to stay warm or cool.

In some aspects, a processor of the electronic lock box may receive, from a server, an indication of an electronic order. The indication may include a description and/or characteristic of an item, a tracking number associated with the electronic order, and/or an expected delivery date associated with the electronic order. As an example, the item may be a product ordered from an electronic marketplace. As another example, the item may be food ordered from a food delivery service. The processor may store, in a memory associated with the electronic lock box, the indication of the description of the item, the tracking number, and the expected delivery date.

In some aspects, the processor may identify, via a code reader (e.g., a barcode reader) associated with the electronic lock box, a code (e.g., a barcode or a quick response (QR) code) associated with an item. The item may include the item, such as the product or food. The processor may determine, from the barcode, a tracking number associated with the item. The processor may determine that the tracking number associated with the item corresponds to the tracking number associated with the electronic order. The processor may determine that a current date corresponds to the expected delivery date associated with the electronic order. In other words, the processor may determine that the item is indeed an item that is expected to be delivered.

In some aspects, the processor may provide, to a locking mechanism, an instruction to unlock one of the sections of the electronic lock box to hold the item. For example, the processor may provide an instruction to a first locking mechanism to unlock the heating section, an instruction to a second locking mechanism to unlock the cooled section, or an instruction to a third locking mechanism to unlock the non-temperature controlled section. In some aspects, the processor may select the heating section, the cooled section, or the non-temperature controlled section based on the description and/or characteristics of the item, as indicated on the electronic order. For example, the processor may identify key words or phrases in the description of the item and determine whether the item should stay warm, stay cool, or is suitable for being kept in a section that is not temperature controlled and open/close the relevant section.

In some aspects, the electronic lock box may securely store items until the items are ready to be retrieved by a user authorized to operate the electronic lock box. The electronic lock box may store items to protect the items from theft or tampering. Further, the electronic lock box may store items to protect the items from weather elements. In some aspects, the electronic lock box may only unlock when certain criteria are met (e.g., the barcode associated with the item indicates a tracking number that corresponds to the tracking number associated with the electronic order, and the current date corresponds to the expected delivery date), thereby prevent unauthorized use of the electronic lock box.

In some aspects, the electronic lock box may be useful for a security use case. For example, a security company that moves cash and valuables may only open the electronic lock box when centrally allowed, and otherwise the electronic lock box cannot be opened. The electronic lock box may transmit a beacon signal, which may indicate a location associated with the electronic lock box at all times, so the location of the electronic lock box may be tracked in real-time. In some aspects, the electronic lock box may be useful for a defense use case. For example, the electronic lock box may ensure that secret documents and assets are shared with authorized personnel. A code to access the electronic lock box may only be shared with the authorized personnel. The electronic lock box may be operated centrally to ensure that the secret documents and assets are securely protected.

FIG. 1 is a diagram of an example implementation 100 related to operating electronic lock boxes. As shown in FIG. 1, example implementation 100 includes a client device, an electronic lock box, and a server. These devices are described in more detail in connection with FIGS. 4 and 5.

In some aspects, the electronic lock box may securely store items after delivery of the items. The electronic lock box may include a heated section that includes a first locking mechanism. The heated section may be warmed to a predefined temperature. The heated section may include a first temperature sensor to capture a temperature associated with the heated section. Alternatively, the heated section may prevent outside air from entering the heated section, thereby allowing items inside the heated section to retain heat. The first locking mechanism may lock or unlock the heated section. The electronic lock box may include a cooled section that includes a second locking mechanism. The cooled section may be cooled to a predefined temperature. The cooled section may include a second temperature sensor to capture a temperature associated with the cooled section. The second locking mechanism may lock or unlock the cooled section. The electronic lock box may include a non-temperature controlled section that includes a third locking mechanism. The non-temperature controlled section may not be temperature controlled, and may be associated with a varying temperature that is based on an outside temperature. The non-temperature controlled section may include a third temperature sensor to capture a temperature associated with the non-temperature controlled section. The third locking mechanism may lock or unlock the non-temperature controlled section. In some aspects, the electronic lock box may include mechanical motors to separately open and close the heated section, the cooled section, and/or the non-temperature controlled section. The mechanical motors may be part of a motorized computer controlled assembly to open and close each of the heated section, the cooled section, and/or the non-temperature controlled section.

In some aspects, the electronic lock box may include a barcode or QR code reader to read barcodes or QR codes associated with items that are being delivered to the electronic lock box. The code reader may help verify that the items are indeed legitimate items that are expected for delivery.

In some aspects, the electronic lock box may include a transceiver for communicating information with the server and/or the client device. The transceiver may be capable of communicating using various communication protocols, such as WiFi, Bluetooth, or mobile networks such as 3G, Long Term Evolution (LTE) (4G), or New Radio (NR) (5G). For example, the client device may receive information from the electronic lock box via the communication protocol, and the server may receive information from the electronic lock box via on the communication protocol.

In some aspects, the electronic lock box may include a location sensor to capture a location associated with the electronic lock box. The electronic lock box may determine the location associated with the electronic lock box using the location sensor. The electronic lock box may transmit an indication of the location to the client device, the server, and/or a drone device. In some aspects, the electronic lock box may include a unique QR code on an outside surface of the electronic lock box that provides an identification of the electronic lock box. The QR code that provides an identity for the electronic lock box when the electronic lock box is part of a plurality of electronic lock boxes that are positioned next to each other. For example, the plurality of electronic lock boxes may include a row of separate electronic lock boxes or a two-dimensional grid of electronic lock boxes.

In some aspects, the heated section of the electronic lock box may include a first camera/ultrasonic sensors/sensors . The first camera and/or sensors may be used to determine a current occupied space (e.g., 60% full) for the heated section. The cooled section of the electronic lock box may include a second camera/ultrasonic sensors/sensors. The second camera and/or sensors may be used to determine a current occupied space for the cooled section. The non-temperature controlled section of the electronic lock box may include a third camera. The third camera/ultrasonic sensors/sensors may be used to determine a current occupied space for the non-temperature controlled section.

In some aspects, the heated section of the electronic lock box may include a first weight sensor. The first weight sensor may be used to determine a total weight (e.g., 10 kilograms) of items currently held in the heated section. The cooled section of the electronic lock box may include a second weight sensor. The second weight sensor may be used to determine a total weight of items currently held in the cooled section. The non-temperature controlled section of the electronic lock box may include a third weight sensor. The third weight sensor may be used to determine a total weight of items currently held in the non-temperature controlled section.

As shown by reference number 102, the electronic lock box may receive, from the server, an indication of an electronic order. The electronic order may be placed via the client device. The electronic order may be placed with an electronic marketplace, a food delivery service, and so on. The electronic lock box may receive the indication of the electronic order from the server based on a unique Internet Protocol (IP) address associated with the electronic lock box. The indication of the electronic order may include a description of an item. The item may be a product, food, and so on. The description of the item may include one or more key words or phrases associated with the item. The indication of the electronic order may include a tracking number associated with the electronic order. The tracking number may be a value composed of numerical values and/or other characters including letters. The indication of the electronic order may include a carrier associated with delivering the item. The indication of the electronic order may include an expected delivery date associated with the electronic order. In some cases, the electronic lock box may receive, from the server, an updated indication of the electronic order, for example, with an updated expected delivery date.

In some aspects, the server may receive electronic order information from various systems, such as electronic marketplace systems, electronic food delivery systems, and so on. The server may connect to the various systems using different application programming interfaces (APIs), which may allow the server to retrieve the electronic order information from the various systems. In other words, when the client device orders an item from one of the various systems, the server may be able to retrieve the electronic order information from the various systems. The server may transmit the electronic order information to the electronic lock box, which may enable the electronic lock box to be unlocked during a delivery of the item.

In some aspects, the server may maintain information related to the electronic lock box. The electronic lock box may register with the server during a registration process. The server may store an administrator username and password associated with the electronic lock box. The server may store an indication of a location associated with the electronic lock box. The server may store an indication of an address associated with the electronic lock box. The server may store authentication information associated with the electronic lock box.

As shown by reference number 104, the electronic lock box may store, in a memory of the electronic lock box, the indication of the electronic order. For example, the electronic may store in the memory the description of the item, the tracking number, and the expected delivery date. The electronic lock box may use this information when the item is later delivered.

In some aspects, in a manual delivery, a delivery person may attempt to deliver the item to the electronic lock box. Initially, the electronic lock box may be locked. A code associated with the item may be read by the code reader associated with the electronic lock box. For example, the delivery person may hold the code associated with the item in proximity to the code reader, such that the code reader may scan the code associated with the item. The code may be on a packaging that holds the item.

In some aspects, a processor of the electronic lock box may identify, via the code reader, the code associated with an item. The processor may determine, from the code, a tracking number associated with the item and the description of the item. In other words, the code may indicate the tracking number associated with the item. The processor may compare the tracking number associated with the item, as indicated by the code, with the tracking number associated with the electronic order, which may be stored in the memory of the electronic lock box. The processor may determine that the tracking number associated with the item corresponds to the tracking number associated with the electronic order. The processor may compare a current date with the expected delivery date associated with the electronic order, which may be stored in the memory of the electronic lock box. The processor may determine that the current date corresponds to the expected delivery date associated with the electronic order.

As shown by reference number 108, the processor may determine to unlock one of the sections of the electronic lock box. The processor may determine to unlock one of the sections based on the tracking number associated with the item, as indicated by the code, corresponding to the tracking number associated with the electronic order. Further, the processor may determine to unlock one of the sections based on the current date corresponding to the expected delivery date associated with the electronic order.

In some aspects, the processor may determine to unlock one of the sections of the electronic lock box based on an availability of space in an appropriate section of the electronic lock box. The processor may determine, using one or more weight sensors or cameras in the heated section, the cooled section, and the non-temperature controlled section, that the heated section, the cooled section, or the non-temperature controlled section has available space to hold the item. The processor may provide an instruction to unlock based on the heated section, the cooled section or the non-temperature controlled section having space to hold the item.

In some aspects, the electronic lock box may include a keypad on which the delivery person may manually enter a code. The code may be a predefined code set by a user associated with the electronic lock box. The code may be a predefined code that corresponds to a carrier that is delivering the package. For example, a first carrier may use a first code, a second carrier may use a second code, and so on. The processor may identify the code entered via the keypad, and when the code matches one of a plurality of predefined codes, the processor may determine to unlock one of the sections of the electronic lock box.

As shown by reference number 110, the processor may provide an instruction to unlock and automatically open one of the sections of the electronic lock box. The processor may provide, to the first locking mechanism, the second locking mechanism or the third locking mechanism, an instruction to unlock the heated section, the cooled section, or the non-temperature controlled section, respectively, to hold the item after delivery. The heated section may be unlocked via the first locking mechanism, the cooled section may be unlocked via the second locking mechanism, or the non-temperature controlled section may be unlocked via the third locking mechanism.

In some aspects, the processor may provide the instruction to unlock the heated section, the cooled section, or the non-temperature controlled section based on the description of the item. The description of the item, as indicated by the electronic order previously received from the server, may indicate key words and/or phrases associated with the item. Based on the key words and/or phrases, the processor may determine whether the item should stay warm, stay cool, or is suitable for being kept in a section that is not temperature controlled. The processor may determine to unlock the heated section, the cooled section, or the non-temperature controlled section based on various requirements of the item being delivered. In some aspects, the processor may use a machine learning model and/or may learn over time which items are to be associated with certain sections of the electronic lock box. In some aspects, the processor may provide the instruction to unlock the heated section, the cooled section, or the non-temperature controlled section based on user input received via a user interface of the electronic lock box. For example, the user input may indicate a selection of a relevant section of the electronic lock box to unlock and open.

As an example, the processor may determine that a sweater that is being delivered does not need to be heated or cooled based on the description of the sweater in the electronic order. In this case, the processor may provide an instruction to unlock the non-temperature controlled section. As another example, the processor may determine that a medicine that is being delivered needs to be cooled based on the description of the medicine in the electronic order. In this case, the processor may provide an instruction to unlock the cooled section. As yet another example, the processor may determine that a pizza that is being delivered from a restaurant should be heated, and the processor may provide an instruction to unlock the heated section. In some examples, the processor may access a database that indicates common items and corresponding heating/cooling requirements. For example, the database may indicate that a milk bottle needs to be cooled, but toys do not need to be cooled or heated.

In some aspects, after the first unlocking mechanism unlocks the heated section, mechanical motors associated with the heated section may cause the heated section to open. In some aspects, after the second unlocking mechanism unlocks the cooled section, mechanical motors associated with the cooled section may cause the cooled section to open. In some aspects, after the third unlocking mechanism unlocks the non-temperature controlled section, mechanical motors associated with the non-temperature controlled section may cause the non-temperature controlled section to open.

In some aspects, the processor may determine to not unlock one of the sections of the electronic lock box. The processor may determine to not unlock one of the sections based on the tracking number associated with the item, as indicated by the code, not corresponding to the tracking number associated with the electronic order. The processor may determine to not unlock one of the sections based on the current date not corresponding to the expected delivery date associated with the electronic order. The processor may determine to not unlock one of the sections based on weight information and/or space information that indicates that one or more of the sections of the electronic lock box are at capacity.

For example, the processor may determine that a certain item should be delivered in a certain section, but that certain may not be available to hold the item. In this case, the transceiver may transmit a notification to the client device. The client device may provide the electronic lock box with an instruction to open another section of the electronic lock box to hold the package.

As shown by reference number 112, the transceiver of the electronic lock box may transmit, to the server and/or the client device, an indication that the item has been successfully delivered and is being held in the electronic lock box. The server may determine that the item has been successfully delivered based on the indication received from the transceiver. Further, the user associated with the electronic lock box may be notified, via an application executing on the client device, that the item has been successfully delivered and is being held in the electronic lock box. The user may retrieve the item from the electronic lock box after delivery of the item.

As shown by reference number 114, the processor may send an instruction to the first locking mechanism, the second locking mechanism or the third locking mechanism to lock and automatically close the heated section, the cooled section, or the non-temperature controlled section, respectively, after the item has been delivered. The processor may determine that the item has been delivered to the heated section, the cooled section, or the non-temperature controlled section, and based on the determination, the processor may send the instruction. As a result, after the delivery of the item, the electronic lock box may not be accessible to users other than the user associated with the electronic lock box. For example, after the electronic lock box is opened, the item is placed within one of the sections of the electronic lock box, and a lid associated with one of the sections is closed, the electronic lock box may no longer be opened, for example, by the delivery person for security reasons.

In some aspects, the transceiver may receive, from the server or the client device, an instruction to unlock the heated section, the cooled section, or the non-temperature controlled section. The processor may send an instruction to the first locking mechanism, the second locking mechanism or the third locking mechanism to unlock based on the instruction received from the server or the client device. As an example, the delivery person may have accidentally closed a lid of one of the sections and/or misplaced the item in one of the sections. In these examples, the delivery person may be prevented from opening another section of the electronic lock box. In these situations, the server or the client device may instruct the electronic lock box to open one of the sections to allow the delivery person to place the item in an appropriate section of the electronic lock box.

In some aspects, after the processor determines to unlock the electronic lock box, the processor may send an indication for display via a user interface of the electronic lock box. The user interface may prompt the delivery person to select which section to open in the electronic lock box to deliver the item. For example, the user interface may provide an option to unlock the heated section, the cooled section, or the non-temperature controlled section.

As shown by reference number 116, the transceiver may send one or more indications to the server and/or the client device, or alternatively, the transceiver may receive the one or more indications from the server and/or the client device. In some aspects, the transceiver may transmit an indication of an open-close status for each of the heated section, the cooled section, and the non-temperature controlled section. The open-close status may indicate whether a corresponding section is currently opened or closed. In some aspects, the transceiver may transmit an indication of a current temperature reading for each of the heated section, the cooled section, and the non-temperature controlled section. Temperature readings may be captured using temperature sensors in the heated section, the cooled section, and the non-temperature controlled section. In some aspects, the transceiver may transmit an indication of a current volume status for each of the heated section, the cooled section, and the non-temperature controlled section. Information regarding volumes may be captured using cameras in the heated section, the cooled section, and the non-temperature controlled section. In some aspects, the transceiver may transmit an indication of a total weight of delivered items for each of the heated section, the cooled section, and the non-temperature controlled section. Weight information may be captured using weight sensors in the heated section, the cooled section, and the non-temperature controlled section. The weight information may track a weight associated with each item delivery in a particular section of the electronic lock box. For example, the weight information may indicate that a first delivered item weighs 2 kilograms, a second delivered item weighs 3 kilograms, and so on. In some aspects, the transceiver may transmit an indication of an error in operation or an environmental condition of the electronic lock box. The indication of the error in operation or the environmental condition may be based on a sensor reading of a sensor within the electronic lock box.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
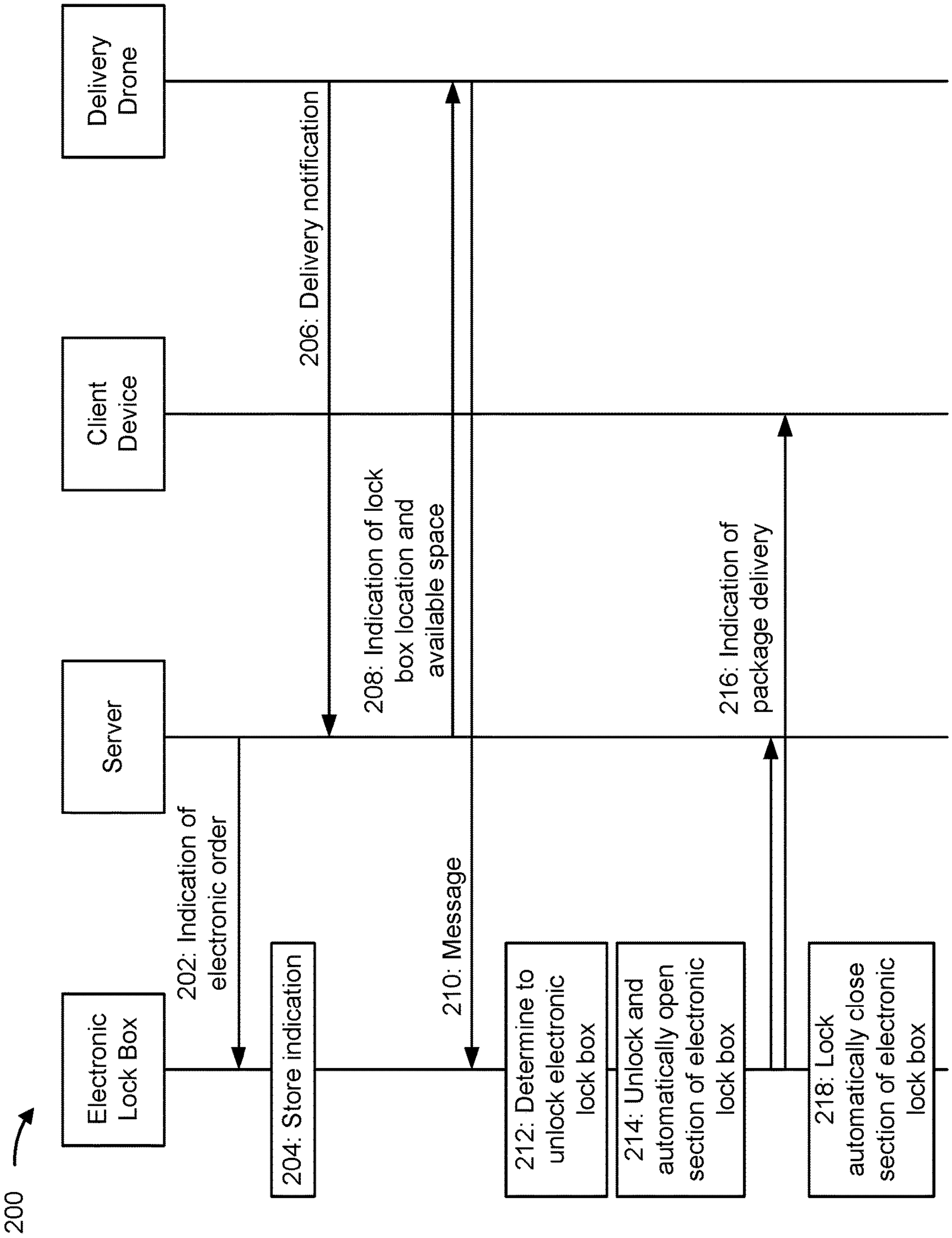
FIG. 2 is a diagram of an example implementation relating to operating electronic lock boxes.

FIG. 2 is a diagram of an example implementation 200 related to operating electronic lock boxes. As shown in FIG. 2, example implementation 200 includes a client device, an electronic lock box, a server, and a drone device. These devices are described in more detail in connection with FIGS. 4 and 5.

As shown by reference number 202, the electronic lock box may receive, from the server, an indication of an electronic order. The indication of the electronic order may include a description of an item, a tracking number associated with the electronic order, and an expected delivery date associated with the electronic order. The electronic lock box may receive the indication of the electronic order from the server based on a unique IP address associated with the electronic lock box.

As shown by reference number 204, the electronic lock box may store, in a memory of the electronic lock box, the indication of the electronic order. For example, the electronic may store in the memory the description of the item, the tracking number, and the expected delivery date.

As shown by reference number 206, the delivery drone, which may be assigned to deliver the item to the electronic lock box, may transmit a delivery notification to the server. The delivery notification may indicate that the delivery drone is enroute to delivering the item. The delivery notification may indicate an approximate delivery window associated with the delivery of the item. The delivery notification may indicate a current location of the delivery drone, which may enable the server to calculate a distance and/or travel time between the delivery drone and the electronic lock box.

As shown by reference number 208, the server may transmit, to the delivery drone, an indication of a location associated with the electronic lock box. The server may receive the indication of the location from the electronic lock box. The electronic lock box may determine the location using a location sensor associated with the electronic lock box. In some cases, the delivery drone may already have information regarding the location of the electronic lock box, based on the electronic order. Further, the indication may indicate that the electronic lock box has space to hold the item.

In some aspects, the delivery drone may travel to the location associated with the electronic lock box based on the indication received from the server. The delivery drone may scan for a QR code that is associated with the electronic lock box of interest. In one example, the electronic lock box may be one of a plurality of electronic lock boxes within an area, and each electronic lock box may include a QR code for identification purposes. The delivery may identify the electronic lock box of interest based on the QR code associated with the electronic lock box.

As shown by reference number 210, the electronic lock box may receive a message from the delivery drone. The message may indicate that the delivery drone has the item to be delivered. The electronic lock box may receive the message after the delivery arrives at the location associated with the electronic lock box. The delivery drone may transmit the message based on the indication received from the server that the electronic lock box has space to hold the item. The message may indicate a tracking number associated with the item. The delivery drone may transmit the message using a Bluetooth protocol or Near Field Communication (NFC) based on a proximity between the delivery drone and the electronic lock box.

As shown by reference number 212, a processor of the electronic lock box may determine to unlock one of the sections of the electronic lock box. The processor may determine to unlock one of the sections based on the message received from the delivery drone. The processor may determine that the tracking number indicated in the message corresponds to the tracking number associated with the electronic order. The processor may determine that a current date corresponds to the expected delivery date associated with the electronic order.

In some aspects, the delivery drone may hold the item in proximity to a code reader of the electronic lock box. The processor may identify, via the code reader, a code associated with the item. The processor may determine, from the code, a tracking number associated with the item and the description of the item. The processor may determine that the tracking number associated with the item, as indicated by the code, corresponds to the tracking number associated with the electronic order. In this case, the processor may determine to unlock one of the sections of the electronic lock box. In other words, the processor may determine to unlock one of the sections based on the message received from the delivery drone and/or the code associated with the item.

As shown by reference number 214, the processor may provide an instruction to unlock and automatically open one of the sections of the electronic lock box based on the message received from the electronic lock box. The processor may provide, to a first locking mechanism, a second locking mechanism or a third locking mechanism, an instruction to unlock a heated section of the electronic lock box, a cooled section of the electronic lock box, or a non-temperature controlled section of the electronic lock box, respectively, to hold the item after delivery. The heated section may be unlocked via the first locking mechanism, the cooled section may be unlocked via the second locking mechanism, or the non-temperature controlled section may be unlocked via the third locking mechanism. In this example, the item may be delivered to and placed in the heated section, the cooled section, or the non-temperature controlled section via the delivery drone.

As shown by reference number 216, the transceiver of the electronic lock box may transmit, to the server and/or the client device, an indication that the item has been successfully delivered and is being held in the electronic lock box.

As shown by reference number 218, the processor may send an instruction to the first locking mechanism, the second locking mechanism or the third locking mechanism to lock and automatically close the heated section, the cooled section, or the non-temperature controlled section, respectively, after the item has been delivered.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
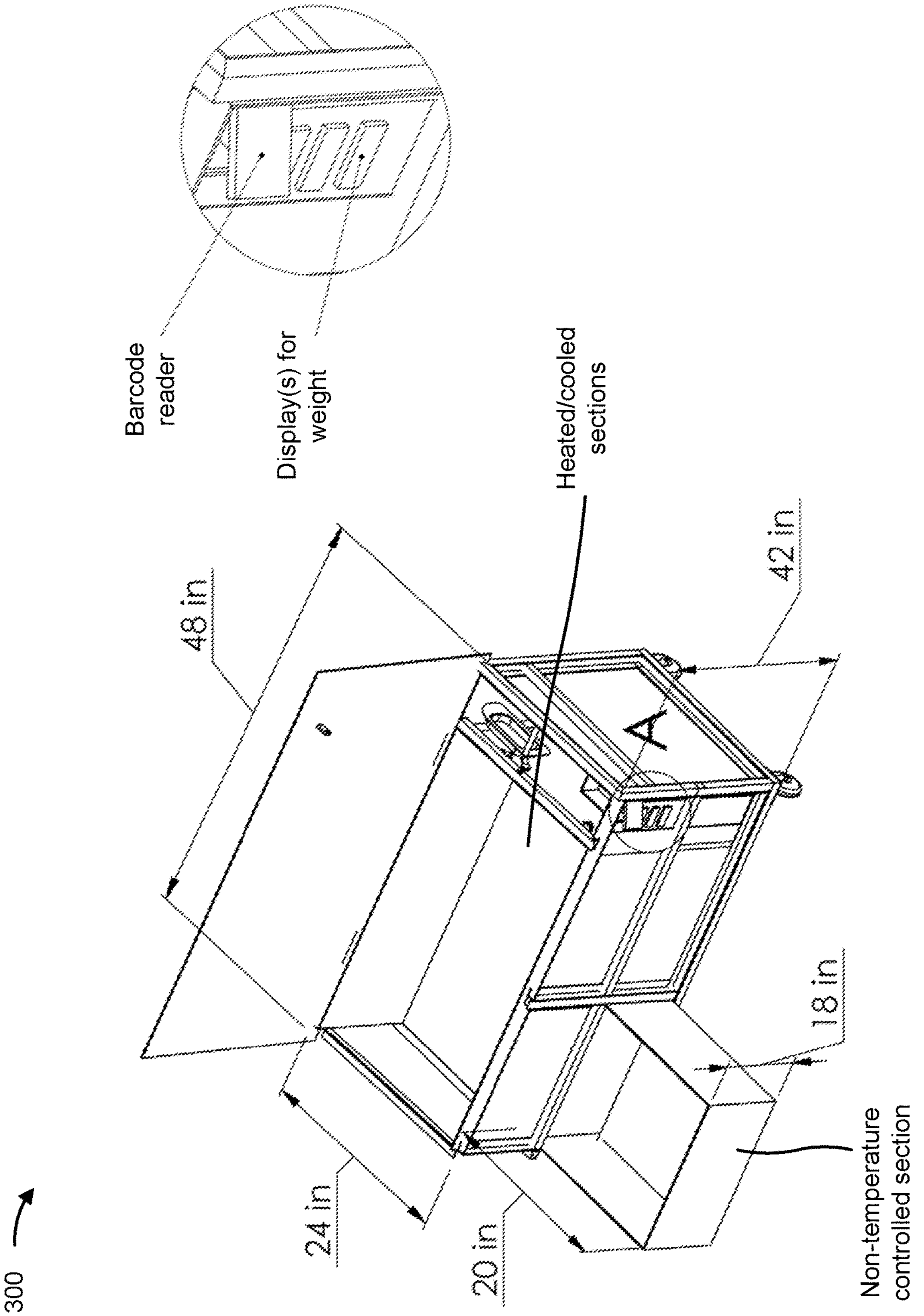
FIG. 3 is a diagram of an example implementation relating to electronic lock boxes.

FIG. 3 is a diagram of an example implementation 300 relating to electronic lock boxes.

In some aspects, an electronic lock box may include a heated section, a cooled section, and/or a non-temperature controlled section. In some aspects, the electronic lock box may include a code reader. The code reader may scan a code associated with an item. The heated section, the cooled section, or the non-temperature controlled section may be unlocked and opened based on the code associated with the item. In some aspects, the electronic lock box may include one or more displays, which may indicate a current item weight associated with the heated section, the cooled section, and/or the non-temperature controlled section. In some aspects, the electronic lock box may include a user interface to allow a delivery person to select which section of the electronic lock box to be unlocked for delivery of the item.

As indicated above, FIG. 3 is provided as an example. Other examples may differ from what is described with regard to FIG. 3.

Figure 4:
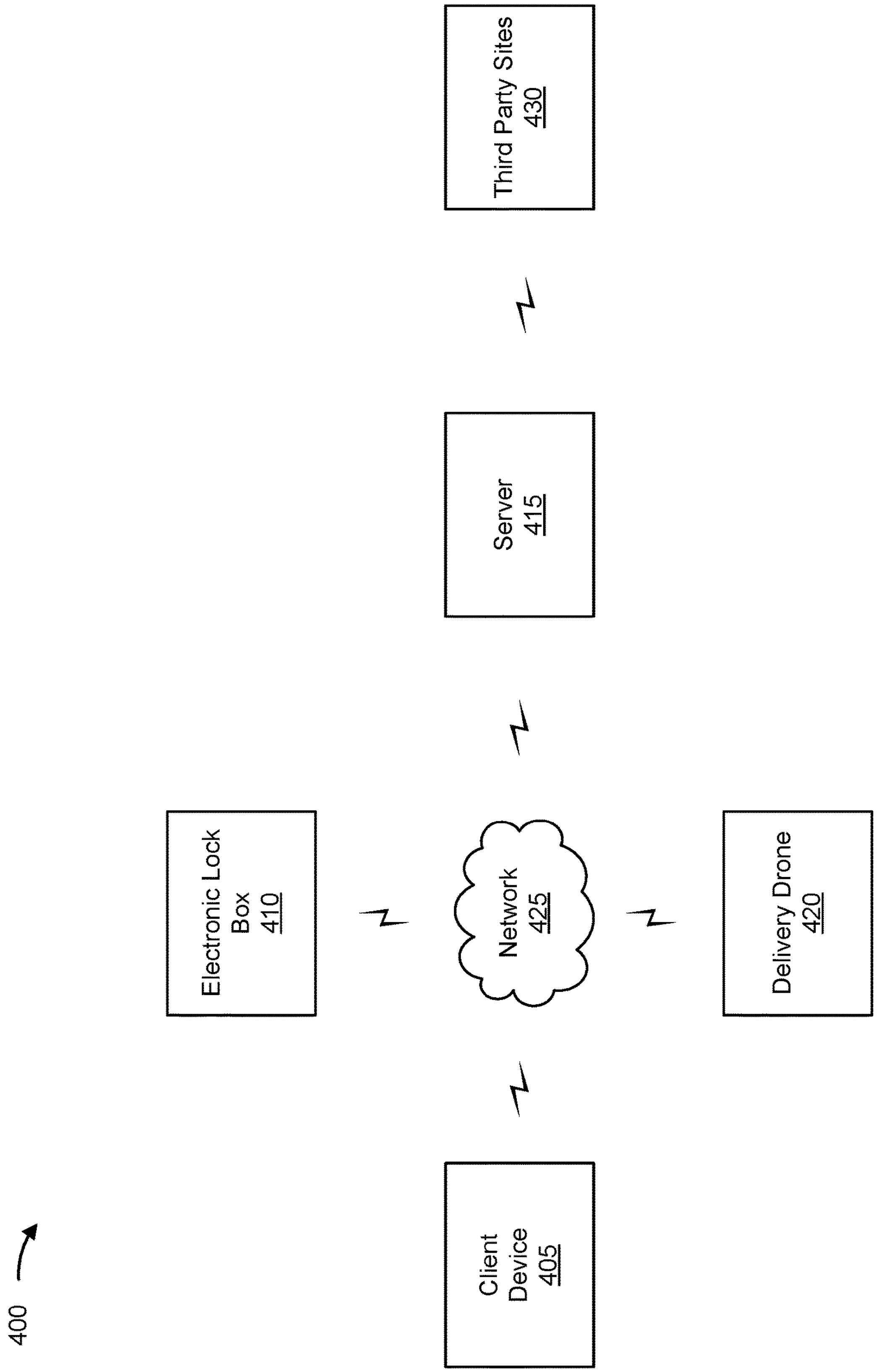
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a client device 405, an electronic lock box 410, a server 415, a drone device 420, and a network 425. Devices of environment 400 may interconnect via wired connections, wireless connections, or a combination of wired and wireless connections.

The client device 405 includes one or more devices capable of receiving, generating, storing, processing, and/or providing information associated with operating electronic lock boxes, as described elsewhere herein. The client device 405 may include a communication device and/or a computing device. For example, the client device 405 may include a wireless communication device, a phone such as a smart phone, a mobile phone or a video phone, a user equipment, a laptop computer, a tablet computer, a desktop computer, or a similar type of device. In some implementations, the client device 405 may be used to connect to each of a plurality of virtual sessions associated with the aggregated virtual session.

The electronic lock box 410 may be capable of holding an item, as described elsewhere herein. The electronic lock box 410 may include various sections, such as a heated section, a cooled section, and/or a non-temperature controlled section. The electronic lock box 410 may include mechanical motors for opening and closing the heated section, the cooled section, and/or the non-temperature controlled section. The electronic lock box 410 may include cameras and/or weight sensors in the heated section, the cooled section, and/or the non-temperature controlled section for determining weights and/or volumes associated with delivered items. The electronic lock box 410 may include a transceiver for communicating with the server 415 and the client device 405. The electronic lock box 410 may include a code reader for scanning codes associated with items. The electronic lock box 410 may include a location sensor for identifying a current location associated with the electronic lock box 410.

The server 415 includes one or more devices capable of receiving, generating, storing, processing, providing, and/or routing information associated with operating electronic lock boxes, as described elsewhere herein. The server 415 may receive, generate, store, process, provide, and/or route the information based on access to one or more third party sites 430. The third party sites 430 may include electronic pages associated with an electronic marketplace, a food delivery service, and so on. The server 415 may include a communication device and/or a computing device. For example, the server 415 may include a server, such as an application server, a client server, a web server, a database server, a host server, a proxy server, a virtual server (e.g., executing on computing hardware), or a server in a cloud computing system. In some implementations, the server 415 includes computing hardware used in a cloud computing environment.

The drone device 420 may be an unmanned aerial vehicle and/or unmanned terrestrial vehicle capable of delivering items to the electronic lock box 410. The drone device 420 may deliver the items with or without a human accompanying the drone device 420. The drone device 420 may include various position and movement sensors. The drone device 420 may include actuators to control motors, engines, propellers, etc. that move the drone device 420.

The network 425 includes one or more wired and/or wireless networks. For example, the network 425 may include a cellular network, a public land mobile network, a local area network, a wide area network, a metropolitan area network, a telephone network, a private network, the Internet, and/or a combination of these or other types of networks. The network 425 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
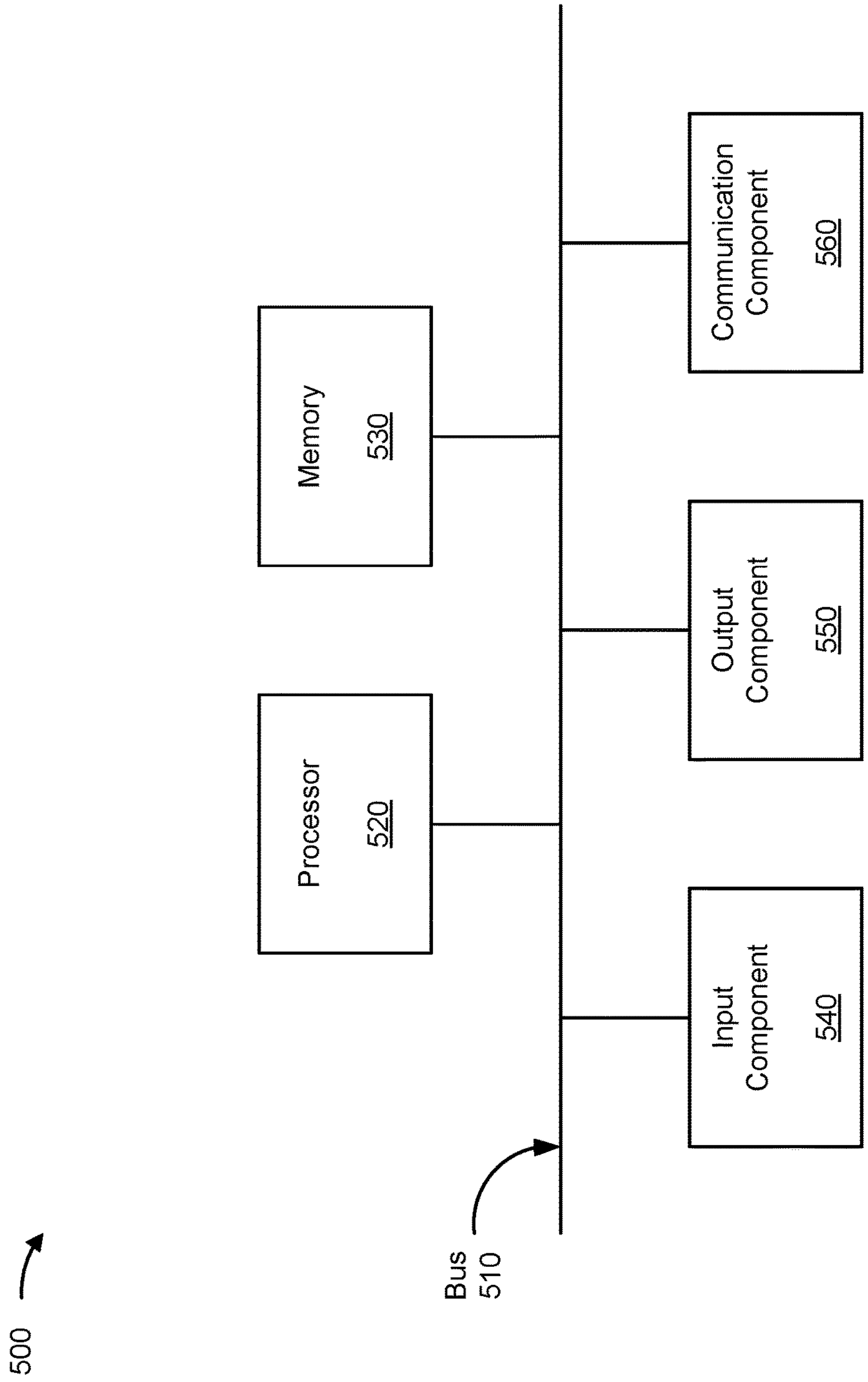
FIG. 5 is a diagram of example components of one or more devices of FIG. 4.

FIG. 5 is a diagram of example components of a device 500, which may correspond to the client device 405, the electronic lock box 410, the server 415, and/or the drone device 420. In some implementations, the client device 405, the electronic lock box 410, the server 415, and/or the drone device 420 may include one or more devices 500 and/or one or more components of device 500. As shown in FIG. 5, device 500 may include a bus 510, a processor 520, a memory 530, a storage component 540, an input component 550, an output component 560, and a communication component 570

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory, a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, and/or an actuator. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, and/or an antenna.

Device 500 may perform one or more processes described herein. For example, a non-transitory computer-readable medium (e.g., memory 530 and/or storage component 540) may store a set of instructions (e.g., one or more instructions, code, software code, and/or program code) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
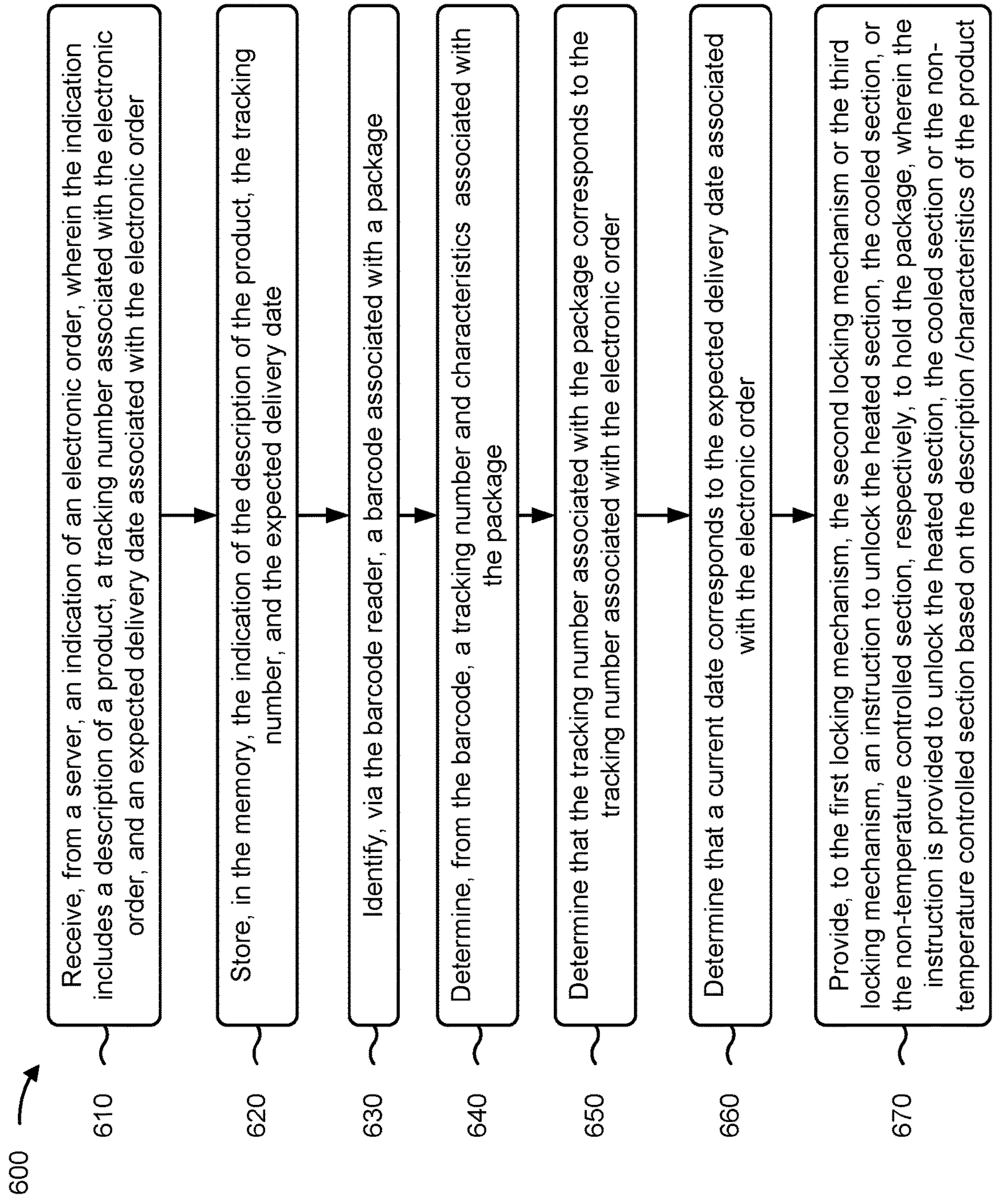
FIG. 6 is a flowchart of an example process relating to operating electronic lock boxes.

FIG. 6 is a flowchart of an example process 600 associated with operating electronic lock boxes. In some implementations, one or more process blocks of FIG. 6 may be performed by a system (e.g., client device 405, electronic lock box 410, server 415, and/or drone device 420). In some implementations, one or more process blocks of FIG. 6 may be performed by another device or a group of devices separate from or including the system, such as client device 405, electronic lock box 410, server 415, and/or delivery drone 420. Additionally, or alternatively, one or more process blocks of FIG. 6 may be performed by one or more components of device 500, such as processor 520, memory 530, storage component 540, input component 550, output component 560, and/or communication component 570.

As shown in FIG. 6, process 600 may include receiving, from a server, an indication of an electronic order (block 610). The indication may include a description of an item, a tracking number associated with the electronic order, and an expected delivery date associated with the electronic order. As further shown in FIG. 6, process 600 may include storing, in a memory, the indication of the description of the item, the tracking number, and the expected delivery date (block 620). As further shown in FIG. 6, process 600 may include identifying, via a code reader, a code associated with an item (block 630). As further shown in FIG. 6, process 600 may include determining, from the code, a tracking number associated with the item and the description of the item (block 640). As further shown in FIG. 6, process 600 may include determining that the tracking number associated with the item corresponds to the tracking number associated with the electronic order (block 650). As further shown in FIG. 6, process 600 may include determine that a current date corresponds to the expected delivery date associated with the electronic order (block 660). As further shown in FIG. 6, process 600 may include providing, to a first locking mechanism, a second locking mechanism or a third locking mechanism, an instruction to unlock a heated section, a cooled section, or a non-temperature controlled section, respectively, to hold the item (block 670). The instruction may be provided to unlock the heated section, the cooled section or the non-temperature controlled section based on the description of the item.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item. No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An electronic lock box, comprising:

a heated section that includes a first locking mechanism;

a cooled section that includes a second locking mechanism;

a non-temperature controlled section that includes a third locking mechanism;

a code reader;

a processor, coupled to a memory, configured to:

receive, from a server, an indication of an electronic order, wherein the indication includes a description of an item including key words or phrases associated with the item, a tracking number associated with the electronic order, and an expected delivery date associated with the electronic order;

store, in the memory, the indication of the description of the item, the tracking number, and the expected delivery date;

identify, via the code reader, a code associated with an item;

determine, from the code, a tracking number associated with the item and the description of the item;

determine that the tracking number associated with the item corresponds to the tracking number associated with the electronic order;

determine that a current date corresponds to the expected delivery date associated with the electronic order; and provide, to the first locking mechanism, the second locking mechanism or the third locking mechanism, an instruction to unlock the heated section, the cooled section, or the non-temperature controlled section, respectively, to hold the item, wherein the instruction is provided to unlock the heated section, the cooled section or the non-temperature controlled section based on the description of the item including the key words or phrases associated with the item, as indicated by the indication of the electronic order.

2. The electronic lock box of claim 1, wherein the processor is further configured to:

determine, via one or more of a sensor or a camera in each of the heated section, the cooled section, and the non-temperature controlled section, that the heated section, the cooled section, or the non-temperature controlled section has space to hold the item, wherein the instruction to unlock is provided based on the heated section, the cooled section or the non-temperature controlled section having space to hold the item.

3. The electronic lock box of claim 1, further comprising:

a transceiver configured to transmit, to one or more of the server or a client device, an indication that the item has been successfully delivered and is being held in the electronic lock box.

4. The electronic lock box of claim 1, further comprising:

a transceiver configured to receive, from one or more of the server or a client device, an instruction to unlock and open the heated section, the cooled section, or the non-temperature controlled section via a motorized computer controlled assembly for each of the heated section, the cooled section, or the non-temperature controlled section;

wherein the processor is further configured to send an instruction to the first locking mechanism, the second locking mechanism or the third locking mechanism to unlock and open based on the instruction received from one or more of the server or the client device, wherein the first locking mechanism, the second locking mechanism, and the third locking mechanism are configured to be remotely controlled by an authorized user.

5. The electronic lock box of claim 1, further comprising a transceiver configured to transmit to one or more of the server or a client device or receive from one or more of the server or the client device:

an indication of an open-close status for each of the heated section, the cooled section, and the non-temperature controlled section;

an indication of a current temperature reading for each of the heated section, the cooled section, and the non-temperature controlled section;

an indication of a current volume status for each of the heated section, the cooled section, and the non-temperature controlled section;

an indication of a total weight of delivered items for each of the heated section, the cooled section, and the non-temperature controlled section; and an indication of an error in operation or an environmental condition of the electronic lock box based on a sensor reading.

6. The electronic lock box of claim 1, wherein the electronic lock box is associated with a unique Internet Protocol address.

7. The electronic lock box of claim 1, wherein the item associated is delivered to and placed in the heated section, the cooled section, or the non-temperature controlled section via a delivery drone.

8. The electronic lock box of claim 1, further comprising:

a unique quick response (QR) code on an outside surface of the electronic lock box that provides an identification of the electronic lock box; and a location sensor that captures a location associated with the electronic lock box, wherein the processor is further configured to transmit an indication of the location to the server, wherein the indication of the location is provided to a delivery drone to enable the delivery drone to arrive at the location and scan for the QR code to identify the electronic lock box to hold the item.

9. The electronic lock box of claim 8, further comprising:

a transceiver configured to: receive, directly from the delivery drone or via the server, a message indicating that the delivery drone has the item, wherein the message is received after the delivery drone arrives at the location associated with the electronic lock box, and wherein the message is transmitted by the delivery drone based on an indication received from the server that the electronic lock box has space to hold the item, wherein the processor is further configured to send an instruction to the first locking mechanism, the second locking mechanism or the third locking mechanism to unlock based on the message received from the delivery drone.

10. The electronic lock box of claim 1, wherein the processor is configured to:

determine that the item has been delivered to the heated section, the cooled section, or the non-temperature controlled section; and send an instruction to the first locking mechanism, the second locking mechanism or the third locking mechanism to lock the heated section, the cooled section, or the non-temperature controlled section, respectively, after the item has been delivered.

11. An apparatus, comprising:

a first section that includes a first locking mechanism;

a second section that includes a second locking mechanism;

a third section that includes a third locking mechanism;

a code reader;

a processor, coupled to a memory, configured to:

receive, from a server, an indication of an electronic order, wherein the indication includes a description of an item including key words or phrases associated with the item, a tracking number associated with the electronic order, and an expected delivery date associated with the electronic order;

store, in the memory, the indication of the description of the item, the tracking number, and the expected delivery date;

identify, via the code reader, a code associated with an item;

determine, from the code, a tracking number associated with the item;

determine that the tracking number associated with the item corresponds to the tracking number associated with the electronic order;

determine that a current date corresponds to the expected delivery date associated with the electronic order; and provide, to the first locking mechanism, the second locking mechanism or the third locking mechanism, an instruction to unlock the first section, the second section, or the third section, respectively, to hold the item, wherein the instruction is provided to unlock the first section, the second section or the third section based on the description of the item including the key words or phrases associated with the item, as indicated by the indication of the electronic order.

12. The apparatus of claim 11, wherein the first section is a heated section, the second section is a cooled section, and the third section is a non-temperature controlled section.

13. The apparatus of claim 11, wherein the processor is further configured to:

determine, via one or more of a weight sensor or a camera in each of the first section, the second section, and the third section, that the first section, the second section, or the third section has space to hold the item, wherein the instruction to unlock is provided based on the first section, the second section or the third section having space to hold the item.

14. The apparatus of claim 11, further comprising:

a transceiver configured to transmit, to one or more of the server or a client device, an indication that the item has been successfully delivered and is being held in the apparatus.

15. The apparatus of claim 11, further comprising:

a transceiver configured to receive, from one or more of the server or a client device, an instruction to unlock the first section, the second section, or the third section, wherein the processor is further configured to send an instruction to the first locking mechanism, the second locking mechanism or the third locking mechanism to unlock based on the instruction received from one or more of the server or the client device.

16. The apparatus of claim 11, further comprising a transceiver configured to transmit to one or more of the server or a client device or receive from one or more of the server or the client device:

an indication of an open-close status for each of the first section, the second section, and the third section;

an indication of a current temperature reading for each of the first section, the second section, and the third section;

an indication of a current volume status for each of the first section, the second section, and the third section;

an indication of a total weight of delivered items for each of the first section, the second section, and the third section; and an indication of an error in operation or an environmental condition of the apparatus based on a sensor reading.

17. The apparatus of claim 11, wherein the item is delivered to and placed in the first section, the second section, or the third section via a delivery drone.

18. The apparatus of claim 11, further comprising:

a unique quick response (QR) code on an outside surface of the apparatus that provides an identification of the apparatus; and a location sensor that captures a location associated with the apparatus, wherein the processor is further configured to transmit an indication of the location to the server, wherein the indication of the location is provided to a delivery drone to enable the delivery drone to arrive at the location and scan for the QR code to identify the apparatus to hold the item.

19. The apparatus of claim 18, further comprising:

a transceiver configured to: receive, directly from the delivery drone or via the server, a message indicating that the delivery drone has the item, wherein the message is received after the delivery drone arrives at the location associated with the apparatus, and wherein the message is transmitted by the delivery drone based on an indication received from the server that the apparatus has space to hold the item, wherein the processor is further configured to send an instruction to the first locking mechanism, the second locking mechanism or the third locking mechanism to unlock based on the message received from the delivery drone.

20. The apparatus of claim 11, wherein the processor is configured to:

determine that the item has been delivered to the first section, the second section, or the third section; and send an instruction to the first locking mechanism, the second locking mechanism or the third locking mechanism to lock the first section, the second section, or the third section, respectively, after the item has been delivered.

* * * * *